Patented Jan. 26, 1943

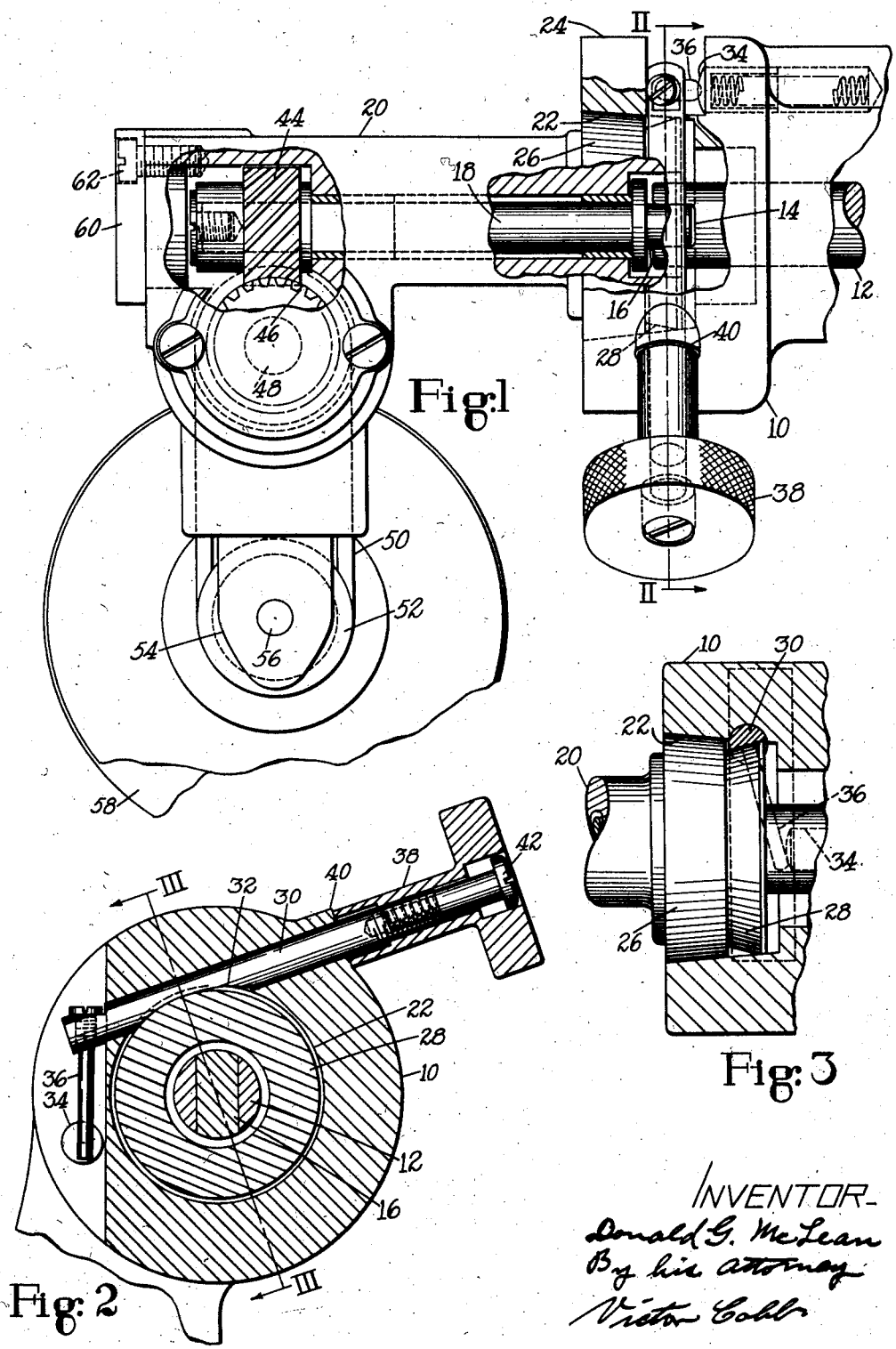

2,309,200

UNITED STATES PATENT OFFICE 2,309,200

COUPLING

Donald G. McLean, Beverly, Mass., assignor to United Shoe Machinery Corporation, Borough of Flemington, N. J., a corporation of New Jersey Application June 21, 1940, Serial No. 341,726

8 Claims. (Cl. 287—1)

This invention relates to a coupling device and more particularly to means for coupling together a member such as a tool head carrying a driven shaft and a support in which is mounted a drive shaft, the shafts being arranged to be automatically connected together when the tool head is connected to the support.

An object of the invention relates to the provision of improved means for coupling a pair of members together, the coupling means being readily actuable by the operator without the use of tools and permitting the members to be locked together in any one of a plurality of relative positions.

More specifically, it is an object of this invention to provide means for coupling together a member such as a tool head carrying a driven shaft to a support carrying a drive shaft, the shafts being automatically connected together when the tool head is secured to the support, the tool head being capable of being secured in any one of a plurality of different positions and being readily removable when desired.

To this end and as a feature of the invention, the support is provided with a frusto-conical socket in a wall thereof into which is arranged to be fitted the tapered end of a member to be secured to the support, the support being provided with a cam bolt movable transversely of the socket, this cam bolt acting on a cam surface of the member to urge the tapered surface on the member into tight fitting engagement with the socket. A driven shaft journaled in the member being secured to the support is arranged to be automatically connected to a drive shaft in the support when the member is secured thereto.

These and other features of the invention will now be described in the specification and illustrated in the drawing, in which Fig. 1 is a plan view partly in section illustrating a tool head and the means for securing it to a support;

Fig. 2 is a vertical section taken on the line II—II of Fig. 1; and

Fig. 3 is a section on the line III—III of Fig. 2.

A support 10 carries a drive shaft 12, the outer end of which is recessed at 14 to engage a flattened portion 16 of a driven shaft 18 journaled in a bracket or tool head 20. The support 10 is provided with a socket 22 in an outer wall 24, this socket being opposite to the shaft 12 and concentric therewith. The socket 22 is tapered as indicated in Figs. 1 and 3 to receive a correspondingly tapered or frusto-conical portion 26 adjacent to the inner end of the tool head 20 so that when the tool head is forced inwardly of the support the portion 26 of the tool head will be seated in firm engagement with the socket 22. The shaft 18 is concentric with the portion 26 of the tool head, so that the shaft may be automatically coupled to the drive shaft 12 when the portion 26 of the tool head is inserted in the socket.

At the extreme end of the tool head 20 and immediately adjacent to the frusto-conical portion 26 thereof is a tapered portion 28, which slopes oppositely to the portion 26. The largest diameter of the portion 28 is smaller than the smallest diameter of the portion 26 so that the portion 28 will not interfere with the entrance of the portion 26 in the socket 22. A cam bolt 30 is slidably and rotatably mounted in the support 10 transversely of the socket and has a recess 32 (Fig. 2) formed therein, this recess being curved lengthwise of the cam bolt and being arranged, upon clockwise rotative movement from the position of Fig. 3, substantially to coincide with the adjacent surface of the socket so as not to interfere with the portion 28 of the tool head upon insertion of the frusto-conical portion 26 of the tool head within the socket. The cam bolt is normally maintained in this position by means of a spring pressed plunger 34 (Fig. 1) acting on a pin 36 extending downwardly from the cam bolt and located within a recess formed in the support at the inner end of the cam bolt. The spring pressed plunger 34 acts through the pin 36 to urge the cam bolt 30 in a clockwise direction (Fig. 3) to a position limited by engagement of the pin with the surface of the recess in the support 10 opposite to the spring pressed plunger.

The cam bolt 30 is threaded at its outer end to receive a nut 38 the inner end of which engages a boss 40 on the support 10 and the outer end of which is enlarged and knurled to facilitate turning thereof by the operator. A screw 42 threaded into the outer end of the cam bolt 30 cooperates with the head of the nut 38 to limit relative movements of the cam bolt and the nut.

In securing the bracket or tool head 20 to the support, the tapered portion 26 is inserted in the socket 22 with the flattened end 16 of the shaft 18 inserted into the recess 14 of the drive shaft 12, the concentric relationship of the drive and driven shafts with the socket 22 and tapered portion 26 respectively facilitating the coupling of the shafts. Upon initial rotation of the nut 38 in a direction to draw the cam bolt 30 axially to the right, as viewed in Fig. 2, the cam bolt 30 first engages the inner end of the portion 28 of the tool head 20. As the nut is rotated farther to move the cam bolt axially, the pressure between the contacting surfaces of the cam bolt and the portion 20 of the tool head increases, setting up a rotative force to turn the cam bolt in a counter-clockwise direction as viewed in Fig. 3 which tends to relieve this pressure. This action continues as the cam bolt is thus moved axially to the right as viewed in Fig. 2 until the cam bolt is seated on the portion 28 of the tool head and assumes the position of Fig. 3. Upon further axial movement of the cam bolt, it exerts a camming or wedging action upon the surface 28 to cause the tapered portion 26 to be drawn into tight-fitting engagement with the socket and to be locked in this position with the driven shaft 18 coupled to the drive shaft 12. In order to permit removal of the member 20 from the support 10, the nut 38 will be rotated in the opposite direction thus permitting the cam bolt 30 to be moved toward the left by the operator upon exertion of a force in this direction upon the nut, thereby relieving the force between the cam bolt 30 and the surface 28, whereupon the spring pressed plunger 34 acting upon the pin 36 will rotate the cam bolt 30 until the pin 36 engages the wall 24 in the support 10, in which position the recess 32 of the cam bolt is in substantial alinement with the socket.

The shaft 18 is illustrated as being provided with a worm 44 at its outer end which engages a worm gear 46 mounted on a shaft 48 at right angles to the shaft 18. This shaft 48 is also provided with a pulley (not shown) connected by a belt 50 to a pulley 52 journaled in an extension 54 of the bracket 20 by means of a shaft 56 which carries a rotatable tool 58 which may be in the form of a buffing wheel. The end of the bracket 20 remote from the support 10 may be closed by a plug 60 secured to the bracket by a screw 62. It will be obvious that the shaft 18 may be connected to any desired form of operating tool in any desired manner, the connections shown being for purposes of illustration only.

It will now be obvious that the position of the rotatable tool 58 relative to the support 10 may be readily adjusted upon loosening the draw bolt 30 by rotating the nut 38 and exerting a force to move the draw bolt axially to the left, as viewed in Fig. 2, thus permitting rotation of the bracket 20 to the desired position whereupon the bracket may be rigidly secured in place by tightening up the draw bolt 30 on the surface 28 of the bracket. Loosening of the draw bolt 30 a sufficient amount permits ready removal of the bracket 20 from the support to be substituted, if desired, by another bracket supporting a different form of operating tool. It will thus be seen that the bracket may be adjusted and secured to the support 10 quickly by the operator without the use of any tools, the arrangement providing a very rigid connection.

Having thus described my invention, what I claim as new and desire to secure by Letters Patent of the United States is:

1. Means for coupling a pair of power operated members comprising a support for one power operated member, said support having a socket with inwardly converging walls, a member for supporting the other power operated member and being arranged to be secured to said support, said last-named member having a surface fitting into said socket and a cam surface adjacent to said first-named surface and inclined oppositely thereto, and a rotatable cam bolt slidable transversely of said socket, said cam bolt having a recess in its periphery curved to form a continuation of the walls of said socket when the cam bolt is in one position, the recessed portion of said cam bolt intersecting said socket when the cam bolt is turned out of said position and being arranged for engagement with said cam surface to force said member with the cam surface inwardly of said support upon axial movement of said cam bolt.

2. Means for coupling a pair of power operated members comprising a support for one power operated member, said support having a socket with inwardly converging walls, a member for supporting the other power operated member and being arranged to be secured to said support, said last-named member having a surface fitting into said socket and a cam face adjacent to said surface and inclined oppositely thereto, a rotatable cam bolt slidable transversely of said socket, said cam bolt having a recess in its periphery curved to form a continuation of said socket when the cam bolt is in one position, the recessed portion of the cam bolt intersecting the socket when the bolt is turned out of said position, and a nut threaded on the cam bolt and acting against said support to cause movement of the cam bolt into engagement with the cam face in response to rotation of said nut in one direction and thereby to force said member with the cam face inwardly of said support.

3. Means for coupling a pair of power operated members comprising a support for one power operated member, said support having a socket with inwardly converging walls, a member for supporting the other power operated member and being arranged to be secured to said support, said last-named member having a surface fitting into said socket and a cam face adjacent to said surface and inclined oppositely thereto, a rotatable cam bolt slidable transversely of said socket, said cam bolt having a recess in its periphery curved to form a continuation of the walls of said socket when the cam bolt is in one position, means urging said cam bolt to said position, and a nut threaded on said cam bolt and acting against the support to cause movement of the cam bolt into engagement with the cam face in response to rotation of said nut in one direction thereby to force said member with the cam face inwardly of said support.

4. A support having a socket with inwardly converging walls in a wall thereof, a member arranged to be secured to said support, said member having a surface fitting into said socket and a cam surface adjacent to said first-named surface and inclined oppositely thereto, a cam bolt movable transversely of said socket and having a curved portion arranged to project through said socket and act upon said cam surface to force said member inwardly of said support upon axial movement of said cam bolt in one direction, and means acting on said cam bolt tending constantly to rotate said cam bolt about its axis to cause the aforementioned portion thereof to move to a position in which it is substantially concentric with and forms a continuation of the walls of said socket.

5. A support having a socket with inwardly converging walls in a wall thereof, a member arranged to be secured to said support, said member having a surface fitting into said socket and a cam face adjacent to said surface and inclined oppositely thereto, and a rotatable cam bolt slidable transversely of said socket, said cam bolt having a concave recess in its periphery curved to form a continuation of the walls of said socket when the cam bolt is in one position, the recessed portion of said cam bolt intersecting said socket when the cam bolt is turned out of said one position and being arranged for engagement with said cam face to force said member inwardly of said support upon axial movement of said cam bolt.

6. A support having a socket with inwardly converging walls in a wall thereof, a member arranged to be secured to said support, said member having a surface fitting into said socket and a cam face adjacent to said surface and inclined oppositely thereto, a rotatable cam bolt slidable transversely of said socket, said cam bolt having a recess in its periphery curved to form a continuation of the walls of said socket when the cam bolt is in one position, means urging said cam bolt to said position, and a nut threaded on said cam bolt and acting against said support to cause movement of said cam bolt into engagement with said cam face in response to rotation of said nut in one direction thereby to force said member inwardly of said support.

7. A coupling device having a socket in a wall thereof the sides of which converge inwardly thereof and a rotatable cam bolt slidably mounted therein transversely of said socket and having a recessed portion arranged to extend slightly into said socket through a wall thereof near the inner end of the socket when in one position, and means acting on said cam bolt to rotate the cam bolt to a position in which the recessed portion substantially coincides with the adjacent wall of said socket.

8. A housing arranged to have detachably secured thereto a bracket, said housing having a socket in a wall thereof the sides of which converge inwardly of the support, a rotatable cam bolt slidably mounted in said housing transversely of said socket and having a recessed portion arranged, when the cam bolt is in one position, to extend slightly into said socket through a wall thereof near the inner end of the socket, and a nut threaded on said cam bolt and acting against said support to cause movement of said cam bolt to said position.

DONALD G. McLEAN.